United States Patent

[11] 3,620,721

| [72] | Inventors | Bernard Hippoliet Tavernier<br>Edegem;<br>Nikolaas Cyriel De Jaeger, Wommelgem;<br>Johannes Josephus Vanheertum, Halle-<br>Zandhoven, all of Belgium |
|---|---|---|
| [21] | Appl. No. | 852,503 |
| [22] | Filed | Aug. 22, 1969 |
| [45] | Patented | Nov. 16, 1971 |
| [73] | Assignee | Gevaert-Agfa N.V.<br>Mortsel, Belgium |
| [32] | Priority | Aug. 22, 1968 |
| [33] | | Great Britain |
| [31] | | 40,247/68 |

[54] LEAD OXIDE-CONTAINING PHOTOCONDUCTIVE RECORDING PROCESS UTILIZING X-RAYS OR VISIBLE LIGHT
5 Claims, No Drawings

[52] U.S. Cl. .................................................... 96/1,
96/1.5, 250/65, 117/201, 252/501
[51] Int. Cl. ........................................................ G03g 5/08
[50] Field of Search ............................................ 96/1.5, 1;
117/201; 250/65; 252/501

[56] References Cited
UNITED STATES PATENTS

| 3,266,932 | 8/1966 | Anolick ........................ | 117/201 |
|---|---|---|---|
| 3,453,141 | 7/1969 | Anoluk et al. ............... | 117/201 |
| 3,543,025 | 11/1970 | Stanton ........................ | 250/65 |
| 2,907,674 | 10/1959 | Metcalfe et al. .............. | 117/37 |
| 3,008,825 | 11/1961 | Van Dorn et al. ............ | 96/1 |
| 3,082,085 | 3/1963 | Miller et al. .................. | 96/1 |

*Primary Examiner*—George F. Lesmes
*Assistant Examiner*—John C. Cooper, III
*Attorney*—William J. Daniel ABSTRACT: Photosensitive recording materials highly sensitive to X-ray and visible light are produced by mechanically fragmenting crystalline orthorhombic lead (II) oxide or a crystalline mixture thereof with tetragonal lead (II) oxide in a ratio of up to about 20:80 to a grain size of about 0.1–0.5 microns with a content of about 20–95 percent tetragonal lead (II) oxide and the balance orthorhombic lead (II) oxide, and dispersing such grains in an electrostatic charge-retaining insulating binder medium.

LEAD OXIDE-CONTAINING PHOTOCONDUCTIVE RECORDING PROCESS UTILIZING X-RAYS OR VISIBLE LIGHT

The present invention relates to the preparation of photoconductive substances, their use in the manufacture of photoconductive recording materials and to such recording materials containing them.

Lead(II) oxide is known as a photoconductor and its use in recording materials has been described, e.g. in the U.S. Pat. Nos. 2,907,674 and 3,008,825. From these specifications is also known that both modifications of lead(II) oxide, viz the commercial yellow lead(II) oxide having an orthorhombic crystalline structure as well as the red to tan lead(II) oxide having a tetragonal crystalline structure can be used in an electrophotographic process.

Vacuum-coated lead(II) oxide layers mainly consisting of the red modification are used in a light-image recording tube known as the "Plumbicon" described in Philips Technisch Tijdschrift 25 (1963) No. 9, p.277–287.

The transformation of yellow lead(II) oxide into brown-red lead(II) oxide by grinding is known from J. Am. Chem. Soc. 64 (1942) p. 1637.

It has been found now that a variety of lead(II) oxide, which is very suited for the preparation of photosensitive recording materials that are highly sensitive for X-rays and visible light can be produced by subjecting lead(II) oxide grains consisting of orthorhombic lead(II) oxide or of a crystalline mixture of tetragonal lead(II) oxide and orthorhombic lead(II) oxide in a weight ratio of at most 80:20, to rubbing or shearing forces as in a grinding operation, whereby the orthorhombic modification of lead(II) oxide is transformed into the tetragonal modification, and said transformation takes place in such a degree that finally the composition of the grains contains at least 20 percent and at most 95 percent by weight of the tetragonal variety.

In a photosensitive article according to the present invention lead(II) oxide grains are present in dispersed form in a binder medium and contain a crystalline mixture of the orthorhombic and tetragonal modification of lead(II) oxide and contain the tetragonal modification for at least 20 percent by weight and at most 95 percent by weight, preferably in the range of 50 to 93 percent by weight.

By grinding not only a change in crystalline structure is obtained. Indeed, the spectral sensitivity maximum shifts to the longer wavelength, i.e. from 390–400 $\mu$ to 500–600 $\mu$ and the type of photoconductivity changes from $n$-type to $p$-type. At the same time the grain size of the lead(II) oxide is strongly reduced. As is known the grain size determines the resolving power of a light-sensitive recording material, so that grinding has an advantageous effect on that property. Grinding that provides the desired crystal modification in present practice normally is carried out to such a degree that grains sizing 0.5 to 0.1 micron are obtained. The grain size of the starting material preferably lies between 1 and 15 $\mu$, more preferably between 1.5 and 5 $\mu$.

The grinding operation may be carried out in dry or wet condition, but is preferably effected in the absence of water. Consequently in wet grinding preference is given to waterfree organic solvents, e.g. weakly polar solvents such as aromatic and aliphatic liquid hydrocarbons such as toluene, white spirit, hexane, and aliphatic esters such as ethyl acetate. When grinding in wet state is applied, a dispersing agent compatible with the said weakly polar solvents is preferably used, with the proviso, however, that the dispersing agent does not substantially increase the electrical conductivity of the recording element to which the lead(II) oxide is applied.

Ionic compounds such as acid aliphatic ester compounds of polyvalent acids, e.g. acid esters of the oxyacids derived from phosphorus have proved to be useful for dispersing purposes without decreasing the dark-resistivity of the photoconductive lead(II) oxide grains. The use of said acid esters as dark-resistivity increasing compounds for photoconductive zinc oxide is described in the U.K. Pat. No. 1,020,504.

In order to determine the degree of transformation of the crystal structure an X-ray diffraction spectrogram is taken at regular time intervals, the evolution of the light-sensitivity is measured by introducing the power sample between two electrodes one of which is transparent to visible light. By exposure to visible light a potential difference is built up between the electrodes, which is directly proportional to the radiation sensitivity of the powder. By means of that test it was observed that the photoconductivity increases with the transformation of the yellow lead(II) oxide into the red variety. However, at the stage at which 95 percent by weight of the lead(II) oxide grains consists of the tetragonal variety, the photoconductivity no longer increased but diminished rather fast.

Any commercial yellow lead(II) oxide may be used as starting material so that no special requirements have to be fulfilled for separating impurities from the crystals, and a certain doping with other metals than lead is not excluded. Preferably, however, in order to obtain a high photocurrent the content of bismuth and silicon should not be higher than 100 and 20 p.p.m. respectively.

The grinding operation may be carried out in any suited apparatus, e.g. a ball mill, jet mill, microatomizer, homogenizer, sand mill, artritor, etc., preferably, however, in a vibratory ball mill in which case results are obtained in a rather short time.

In the preparation of a photoconductive recording material the photoconductor prepared according to the present invention is dispersed in a binder medium and may be combined with any ingredient known in the field of zinc oxide electrophotography.

Thus, in manufacturing a recording material the binder material that is employed in cooperation with the lead(II) oxide prepared according to the present invention is electrically insulating to the extent that an electrostatic charge placed on the layer is not conducted by the binder at a rate to prevent the formation and retention thereon of an electrostatic charge that can serve in electrophotographic processing. The binder has the function of conferring sufficient mechanical strength to the recording element.

Satisfactory binding agents or mixtures thereof are in the group of alkyd resins, silicone resins and copolymers of vinyl acetate and vinyl alcohol esters of higher (preferably $C_{12}$–$C_{18}$ aliphatic carboxylic acids, e.g. copoly (vinyl acetate/vinyl laurate) (80/20).

The photoconductive pigment-binder compositions according to the present invention contain preferably from two to 10 parts by weight of lead(II) oxide for each part by weight of binding agent.

It is self-explanatory that the lead(II) oxide of the present invention can be mixed with other known photoconductive substances, e.g. in order to increase the sensitivity in a particular part of the electromagnetic spectrum, e.g. with photoconductive zinc oxide and other photoconductive chalcogenides such as those described in the U.K. Pat. application 19888/68.

In order to prepare a very homogeneous pigment dispersion the coating composition preferably contains a dispersing agent, which prevents coagulation or flocculation of the lead(II) oxide during storage and coating of the dispersion. In organic nonpolar solvents such as toluene, acid esters of oxyacids of phosphorus e.g. monobutyl phosphate, have proved to be particularly suited for dispersing lead(II) oxide.

The recording materials of the instant invention may be prepared by any of the processes used in the prior art to prepare binder-pigment coatings. Thus, the pigment-binder composition with a suitable solvent for the binder may be flowed on a base material or otherwise coated on the base as by dipping, whirling, spraying, with the use of a doctor blade, a dip roller, etc.

It has been stated experimentally that a coating technique wherein the final recording layer is formed by superposition of more than one layer, e.g. by four superposed thin lead(II) oxide binder layers, an increased chargeability in the dark is obtained.

The thickness of the photoconductive layers is not critical but is open to choice within a wide range according to requirements in each individual case. For X-ray recording a layer thickness of 50 µ and more is not unusual.

Preferably the thickness of the light-sensitive layer or multilayer system is in the range of 15 µ to 100 µ.

In the manufacture of electrophotographic recording materials according to the present invention, a relatively conductive support for the recording element is used if the latter is not self-supporting, e.g. and electroconductive sheet or plate, or an insulating sheet or plate covered with an electroconductive interlayer.

By electroconductive plate or sheet is understood a plate or sheet the specific resistivity of which is smaller than that of the photoconductive layer, preferably at least $10^2$ as small.

Suitable conductive plates or sheets may be made of metals such as aluminum, zinc, copper, tin, iron or lead.

Suitable electroconductive interlayers for insulating supports are, e.g., vacuum-coated metal layers such as silver or aluminum layers, conductive polymer layers, e.g. applied from polymers containing quaternized nitrogen atoms such as those described in the U.K. Pat. No. 950,960, or layers containing in a binder dispersed particles, e.g., carbon black and metal particles. The binder used for said particles preferably has a specific resistivity lower than $10^6$ ohm.cm.

Paper sheets that have an insufficient electrical conductivity are coated or impregnated with substances enhancing their conductivity, e.g. by means of a conductive overcoat such as a metal sheet (e.g. aluminum) laminated thereon.

As substances suited for enhancing the conductivity of a paper sheet, and which can be incorporated into the paper mass are to be mentioned particularly hygroscopic compounds and antistatic agents as described, e.g., in the U.K. Pat. No. 964,877, and antistatic agents of polyionic type e.g. a quaternized ethylene imine polymer.

In view of coating from organic solvents a photoconductive composition onto paper sheets, the latter are preferably made organophobic, i.e. impermeabilized to organic solvents, e.g., by means of a water-soluble colloid by a strong hydration of the cellulose fibers such as in glassine paper.

The photoconductive recording materials of the present invention are particularly suitable for continuous tone recording with X-rays as well as visible light. In order to produce an electrophotographic image, usually the steps known in electrophotography are followed, i.e. electrostatically charging, imagewise exposing and developing, optionally followed by a developer transfer and a fixing step.

The electrostatic charging is preferably a positive corona-charging since therewith best results are obtained. A double corona charging may be applied whereby is understood that both sides of the recording material are corona-charged with charges of opposite sign.

The development of electrostatic images obtained on recording materials of the present invention can occur according to one of the techniques known in electrophotography, wherein use is made of the electrostatic attraction or repulsion of finely divided colored substances, e.g. powder particles applied from a toner-carrier mixture, an insulating liquid or an aerosol.

In case a continuous tone reproduction has to be made electrophoretic development is preferred, wherein finely divided substances are used dispersed in an insulating liquid, e.g. a hydrocarbon liquid. Such developing technique is described, e.g., in the U.K. Pat. Nos. 891,719 and 902,928.

The lead(II)-oxide-containing recording materials of the present invention can also be developed electrolytically i.e. the differences in conductivity between the irradiated portions and the nonirradiated portions of the recording element can be made visible by means of an electrolytic deposit as described, e.g. in the French Pat. No. 1,173,444.

The lead(II)-oxide-containing recording materials of the present invention can also be developed by selective wetting as is described, e.g., in the U.K. Pat. Nos. 1,020,503; 1,020,505; 1,033,419 and 1,033,420.

The following examples illustrate the present invention.

Example 1

Fifty g. of yellow lead(II) oxide sold by Union Métallurgique La Campine, Belgium, where suspended in 100 g. of technical grade toluene in which 0.5 g. of acid monobutyl phosphate was added. This suspension was ground in a ceramic ball mill of 0.5 liter one-third part of which was filled with ceramic balls of 8 mm. diameter. After grinding, 15 cc. of 50 percent solution of ALKYDAL V 15 in toluene was added, whereupon the whole was homogenized for a short while. ALKYDAL V 15 is a registered trademark of Farbenfabriken Bayer, Leverkusen, W. Germany, for a styrenated alkyd resin having an iodine number of less than 5, and acid number of less than 10 and a viscosity of 200–500 cP at 20° C. for a 50 to 60 percent by weight solution in toluene. The following physical parameters have been determined depending on the duration of grinding:

a. the mean grain size (calculated by means of a specific area determination by a dynamic nitrogen adsorption with gas-chromatographical detection, wherein a spherical shape of the particles is assumed).

b. the crystalline composition, and c. the photoelectromotive force (PEMF).

The measurements have been carried out on lead(II) oxide after it had been separated and dried. The results are given in the following table.

| Sample | Duration of grinding in hrs. | Grain diameter in µ | P.E.M.F. (in mV) at λ= 3,900 A. | P.E.M.F. (in mV) at λ= 5,500 A. | Composition in percent by weight of— Orthorhombic | Composition in percent by weight of— Tetragonal |
|---|---|---|---|---|---|---|
| A | 0 | 1.8 | −26 | +0.5 | 98 | 2 |
| B | 1 | 1.5 | −12 | +3 | 95 | 5 |
| C | 2 | 1.0 | −8 | +7 | 92 | 8 |
| D | 8 | 0.58 | −5 | +10 | 88 | 12 |
| E | 16 | 0.33 | −4 | +15 | 77 | 23 |
| F | 32 | 0.25 | −3 | +18 | 52 | 48 |
| G | 64 | 0.19 | 0 | +22 | 21 | 79 |
| H | 128 | 0.16 | +2.5 | +28 | 10 | 90 |
| I | 192 | 0.13 | +1.0 | +15 | 7 | 93 |
| J | 256 | 0.11 | +0.5 | +5 | 3 | 97 |

The lead(II) oxide dispersion was applied to an aluminium-coated paper base in a proportion of 150 g. of lead(II) oxide per sq.m. so as to obtain layers of 60 µ thickness. Then the obtained recording material was charged with a positive corona and exposed for 10 sec. to a medical X-ray tube of 80 kv./10 ma. placed at a distance of 50 cm. The course of discharging during exposure was recorded with a Bruel and Kjaer recording apparatus. In the following table the percent of charge decay is given as a result of this exposure and as a function of the duration of grinding of the lead(II) oxide.

| Duration of grinding in hours | % of charge decay |
|---|---|
| 0 | 23 |
| 1 | 25 |
| 2 | 28 |
| 8 | 39 |
| 16 | 49 |
| 32 | 55 |
| 64 | 62 |
| 128 | 68 |
| 192 | 70 |
| 256 | 50 |

Example 2

Fifty g. of yellow lead(II) oxide of the quality as described in example 1 were ground in dry state for 15 hours in a ceramic vibratory ball mill filled for 50 percent of volume with ceramic balls of 1 cm. diameter. The following values were measured:

| grain size | | 0.23 μ |
| --- | --- | --- |
| P.E.M.F. in V | at – 3,900 A. | + 2.5 |
| | at – 5,500 A. | + 34 |
| % of tetragonal PbO | | 91 |

Then, 100 cc. of toluene were added wherein 0.5 g. of acid mono-butyl phosphate was dissolved and also 25 cc. of the solution of the binding agent of example 1. After 10 hours of homogenizing in the ball mill, the dispersion was applied to aluminum-coated paper as described in example 1. The charge decay determined as described in example 1 amounted to 65 percent.

Example 3

The recording material prepared as described in example 2 was directly X-ray-exposed in order to obtain a reproduction of the structure of a hand. Before exposure the recording material was positively corona-charged at a voltage of 400–800 v. between the recording layer surface and the aluminum base. The exposure proceeded by means of an X-ray dosis yielded by 100 ma.sec. at 52 kv. cathode-anode voltage. During exposure the recording material was kept in a plate holder whereon the hand was placed at a distance of 50 cm. from the exit of the X-ray tube.

The positive charge image was electrophoretically developed with a developer obtained by diluting the concentrated developer composition described hereinafter in a volume ratio of 15/1000 by means of SHELLSOL T (trade name for a hydrocarbon solvent)

| carbon black (average particle size: 20 μ) | 30 g. |
| --- | --- |
| lecithine | 1.5 g. |
| SHELLSOL T (trade name) | 750 cc. |
| resin solution prepared as described hereinafter | 150 g. |

The resin binder solution was prepared by heating at 60° C. 500 g. of ALKYDAL L 67 (trade name of Farbenfabriken Bayer A.G., Leverkusen, W. Germany for a linseed-oil-modified 67 percent by weight alkyd resin) and 500 cc. of white spirit containing 11 percent by weight of aromatic compounds till a clear solution was obtained, and subsequent cooling.

An image of the hand with high detail reproduction of the bone structure was obtained.

We claim:

1. In an electrophotographic method of recording information in which a patter of electrostatic charges is produced on a photoconductive recording layer by steps including applying electrostatic charges to said layer and imagewise exposing said layer to said information, and said charge pattern is developed to form a visible image, the improvement wherein said recording layer comprising an electrostatic charge-retaining insulating binder medium having dispersed therein grains of lead oxide with a size of a 0.1–0.5 microns and consisting of mixtures of about 20–95 percent of tetragonal lead(II) oxide and about 80–85 percent orthorhombic lead(II) oxide derived by mechanically fragmenting crystalline orthorhombic lead(II) oxide or a crystalline mixture thereof with tetragonal lead(II) oxide in a ratio of about 20:80, all proportions being by weight.

2. A method for recording information according to claim 1, wherein said recording layer is iniformly charged with electrostatic charges and said imagewise exposure discharges said electrostatic charges in the exposed areas.

3. A method for recording information according to claim 2, wherein the electrostatic charge pattern is developed by contacting the charged layer with electrostatically attractable material.

4. A method for recording information according to claim 1, wherein the imagewise exposure is carried out by means of X-rays.

5. A method of recording information according to claim 1, wherein the imagewise exposure is carried out by means of visible light.

* * * * *

UNITED STATES PATENT OFFICE
CERTIFICATE OF CORRECTION

Patent No. 3,620,721          Dated November 16, 1971

Inventor(s)   Bernard Hippoliet TAVERNIER et al

It is certified that error appears in the above-identified patent and that said Letters Patent are hereby corrected as shown below:

Column 6, claim 1, line 9, change "patter" to -- pattern --.

line 18, change "80-85" to -- 80-5 --.

line 21, before "about", insert -- up to --.

Signed and sealed this 23rd day of May 1972.

(SEAL)
Attest:

EDWARD M. FLETCHER, JR.　　　　　ROBERT GOTTSCHALK
Attesting Officer　　　　　　　　Commissioner of Patents